Oct. 23, 1928.  1,688,710
C. L. HEISLER
ENAMELING OVEN
Filed Dec. 29, 1926  2 Sheets-Sheet 2

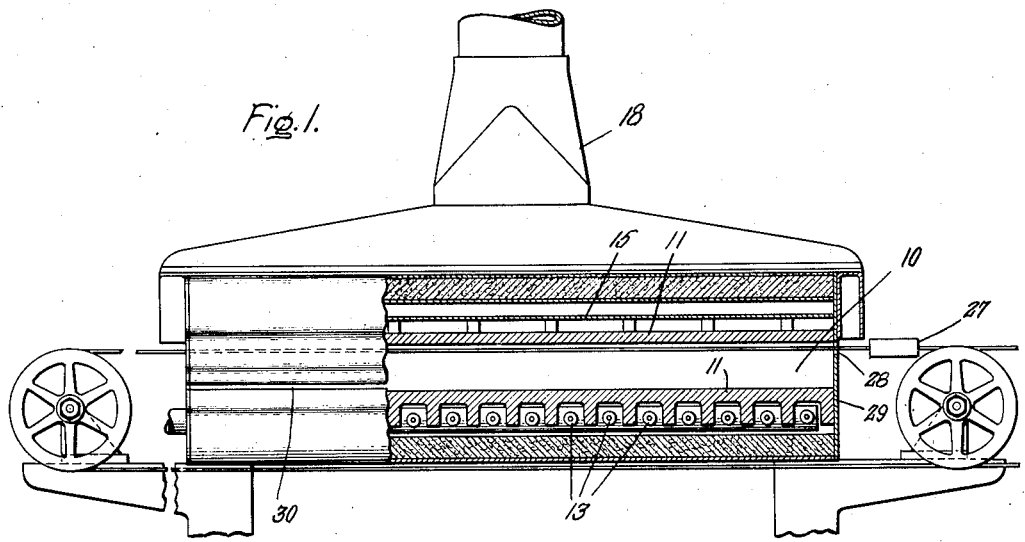
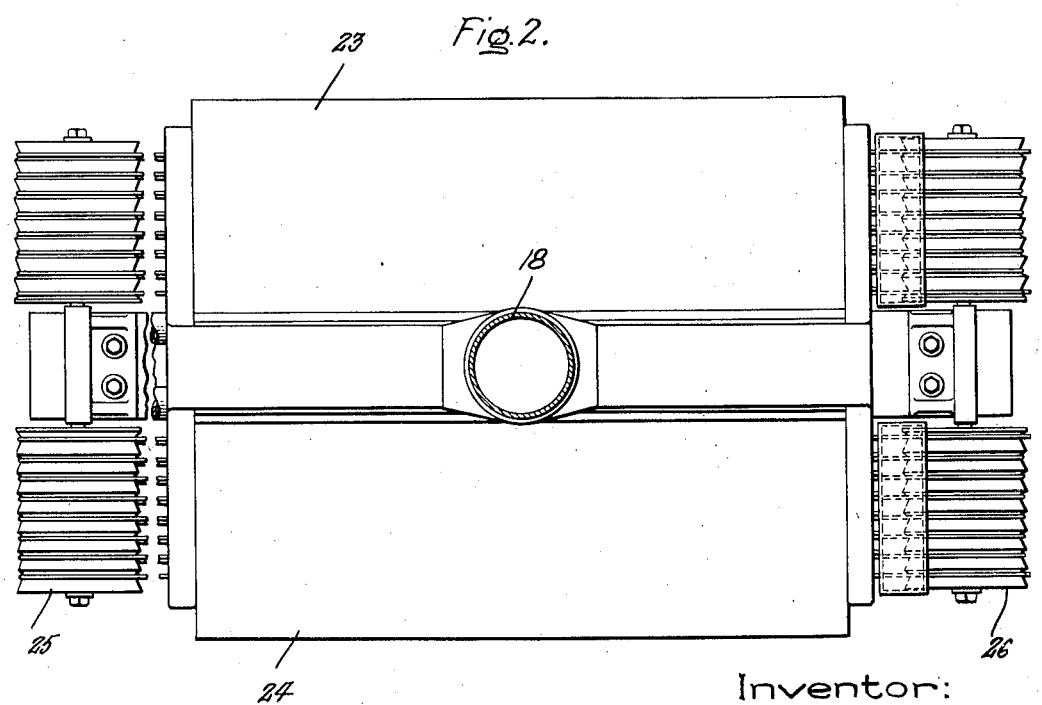

Inventor:
Charles L. Heisler,
by
His Attorney.

Patented Oct. 23, 1928.

1,688,710

UNITED STATES PATENT OFFICE.

CHARLES L. HEISLER, OF SCHENECTADY, NEW YORK, ASSIGNOR TO GENERAL ELECTRIC COMPANY, A CORPORATION OF NEW YORK.

ENAMELING OVEN.

Application filed December 29, 1926. Serial No. 157,800.

My invention relates to enameling ovens, more particularly to ovens for enameling wire, and has for its object the provision of a simple and reliable oven wherein the wires may be readily placed in the oven.

More particularly, my invention relates to ovens for enameling wire, for example, electrical conductors, of the type in which the wire passes around drums at opposite ends of the oven and is thereby fed back and forth through the oven a number of times, a coating of enamel being ordinarily applied before each pass through the oven. In one of its aspects, my invention has for its object the provision of an oven in which the wire may be readily put in place without the necessity of threading it through the oven. In carrying out my invention, I provide a slot in the side of the oven and extending the full length thereof through which the wires may be passed sidewise into the heating chamber.

Figure 3:
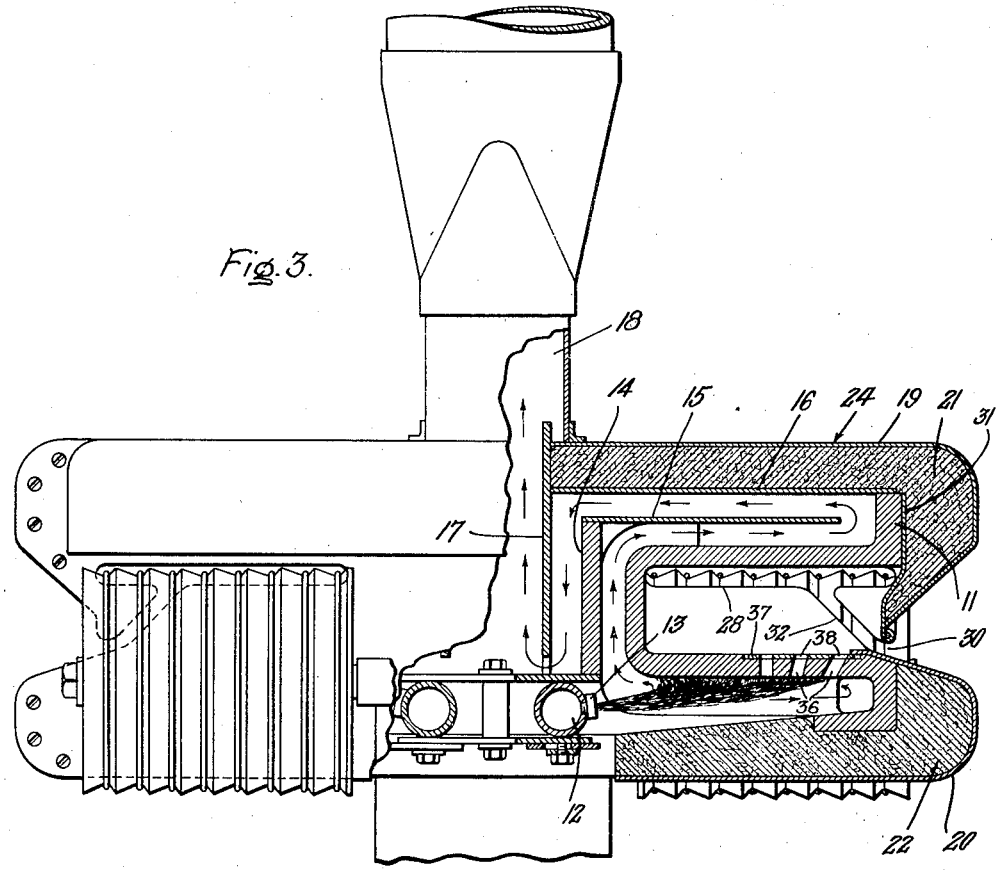
Figure 4:
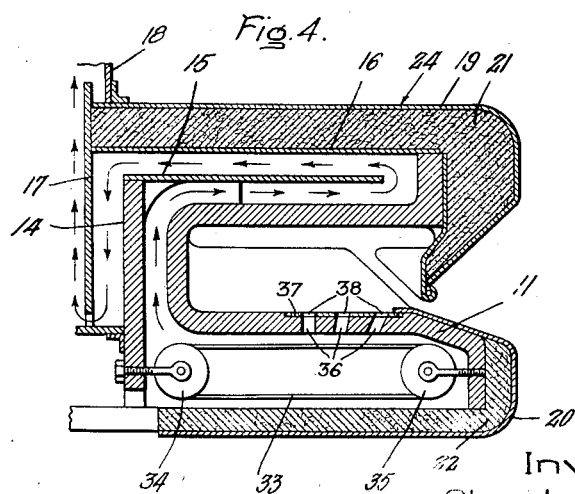

For a more complete understanding of my invention, reference should be had to the accompanying drawing in which Fig. 1 is a side elevation view partly in section of an enameling oven embodying my invention; Fig. 2 is a plan view of the oven shown in Fig. 1; Fig. 3 is an end elevation view partly in section of the device shown in Figs. 1 and 2, while Fig. 4 is a sectional view showing a modified form.

Referring to the drawing, my invention in one form comprises an elongated oven heating chamber 10 which is defined by top, bottom and left hand side walls made of a suitable heat conducting material, such as cast iron. As shown, these walls are formed by a U shaped cast iron member 11 which is placed on its side with its opening toward the right hand side of the furnace, as viewed in Fig. 3. Cooperating with the exterior of the member 11 is suitable heating means, such as a gas heater 12 provided with a plurality of nozzles 13 spaced along the length of the member 11. As shown in Fig. 3, the gas heater is directed against the bottom of the member 11, and the hot gases are caused to pass around the left hand side and top, as indicated by the arrows, by means of suitable baffle walls 14 and 15. After thus passing in contact with the member 11, the hot gases are directed upward and in a reverse direction, and then downward through a flue formed respectively between the walls 14 and 15 and a horizontal wall 16 and a vertical wall 17. Finally, the hot gases pass beneath the lower end of the wall 17 and into a suitable smokestack 18. Outer casings 19 and 20 are provided, the casing 19 being spaced from the wall 16 and the space thus formed filled with a suitable heat insulating material 21, and the casing 20 being suitably spaced from the bottom of the oven to provide space for heat insulating material 22.

It will be observed that I have shown the invention as comprising double ovens 23 and 24, Fig. 2, the smoke stack 18 being placed between the two ovens. Since the two ovens are substantially duplicates, only one oven, i. e., oven 24, will be described in detail, it being understood that the oven 23 is identical or equivalent in construction. At the opposite ends of the oven 24 are two drums 25 and 26, respectively, the upper surfaces of the drums being on a level slightly below the top of the heating chamber 10 so that wires passing over the drums from one to the other will travel through the heating chamber near the top thereof, the wires returning from one drum to the other at the bottom of the oven on the exterior thereof before entering the oven for each travel therethrough. Before entering the oven, the wire passes through a suitable container 27 in which is a bath of the enamel, whereby the wire is given a fresh coat of enamel which is baked upon its subsequent travel through the heating chamber. By providing for a plurality of passes of the wire through the oven, a plurality of consecutive coatings of enamel are applied. As shown, the wire passes through the oven eight times, whereby eight coats of enamel are applied.

The oven is open at each end to provide for the entrance and exit of the wires. As shown in Fig. 3, a horizontal slot 28 is provided for the wires at each end near the top of the heating chamber. This slot, as shown in Fig. 1, is provided in a metal plate 29 secured against the end of the heating chamber, or to be exact, against the end of the member 11. It will be understood that a plate 29 with a slot is provided for the left hand end of the oven, as well as for the right hand end, as shown in Fig. 1.

In order to provide for insertion of the wires, a slot 30 is provided at the outer side of the heating chamber and at the bottom thereof. As shown in Fig. 3, a plate 31 is secured against the upper right hand side of the member 11 and extends downward, terminating in spaced relation with the lower side of the member 11 so as to leave the slot 30. The casing 19 extends around the side of the oven and joins the plate 31 at its lower edge to provide a space for the heat insulating material 21, whereby a heat insulating side wall is provided. As shown in Fig. 3, the end plates 29 are each provided with an inclined slot 32 which communicates at its lower end with the side slot 30 and at its upper end with the horizontal slot 28. By means of this arrangement, it will be observed that each length of wire passing through the oven can be inserted by simply passing it sidewise through the slot 30, then upward through the slots 32 at each end into the horizontal slot 28 where it can be moved to the desired position corresponding with the position it occupies on the drums 25 and 26. By means of this arrangement, the wires can be inserted very quickly and easily, as compared with the usual method of threading them through the heating chamber from one end to the other. Furthermore, by providing the slot 30 near the bottom of the heating chamber, but little loss of heat takes place through the slot.

In the modified form of my invention shown in Fig. 4, I have provided an electric resistor 33 for heating the oven. As shown, this resistor is mounted directly below the member 11 and consists of a length of resistance heating material which is passed around spools 34 and 35 supported at opposite sides of the member 11.

In order to promote rapid initial heating of the furnace, I provided a plurality of apertures 36 (Figs. 3 and 4) in the bottom wall of the heating chamber, i. e., in the member 11. A plate 37 is slidably mounted in guides on the member 11 so as to be slidably movable over the apertures 36 to close them under normal conditions of operation. When the furnace is being preheated upon starting, however, this plate is moved to bring apertures 38 in the plate in coincidence with the apertures 36, whereby the heated gases pass from the source of heat directly into the heating chamber 10. The chamber can thus be heated in a very short time, after which the apertures 36 will be closed by the plate 37 and the temperature maintained by heat conducted through the member 11.

While I have described my invention as embodied in concrete form and as operating in a specific manner, in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States is:

1. An oven for enameling wire comprising walls forming a heating chamber, one of said walls being provided with a relatively narrow opening through which the wire may be passed sidewise into said chamber, and heating means for said chamber.

2. An oven for enameling wire comprising walls forming a heating chamber, one of said walls being provided with a relatively narrow opening near the bottom of said chamber extending lengthwise thereof through which the wire to be enameled may be passed sidewise into said chamber, and heating means for said chamber.

3. An oven for enameling wire comprising walls forming a heating chamber provided with openings at each end, means at one end of said chamber for drawing the wire through said chamber, and means at the opposite end of said chamber for feeding the wire into said chamber, said walls being provided with a slot extending lengthwise of said chamber through which the wire can be passed sidewise into said chamber after being secured to said feeding and drawing means.

4. An oven for enameling wire comprising walls forming a heating chamber provided with an opening at each end, a drum mounted at each end of said chamber adjacent said openings, one of the side walls of said heating chamber being provided with an elongated opening through which the wire to be enameled may be passed sidewise into said chamber and mounted on said drums, and heating means for said chamber.

5. An enameling oven comprising heat conducting walls forming a fuel fired heating chamber, heating means on the outside of chamber, said walls being provided with apertures through which hot gases are admitted directly from said heating means into said chamber for preheating, and means comprising a slidable perforated plate for closing said apertures to shut off said gases after said chamber has been heated.

In witness whereof, I have hereunto set my hand this 24th day of December, 1926.

CHARLES L. HEISLER.